United States Patent [19]

Dupre

[11] Patent Number: 4,622,724
[45] Date of Patent: Nov. 18, 1986

[54] SECURITY CLAMP FOR CABLES

[75] Inventor: Jacques Dupre, La Talaudiere, France

[73] Assignee: Societe DUPRE, Saint-Etienne, France

[21] Appl. No.: 647,643

[22] Filed: Sep. 6, 1984

[30] Foreign Application Priority Data

Sep. 20, 1983 [FR] France .................. 83 15373

[51] Int. Cl.⁴ ............... A44B 13/00; F16G 11/04
[52] U.S. Cl. .................... 24/130; 24/115 H; 24/230.5 R; 24/343; 294/82.11
[58] Field of Search ............ 294/74, 82.1, 82.11, 294/82.12, 82.17, 82.19; 24/115 R, 115 H, 115 J, 115 K, 129 R, 129 A, 130, 131 R, 230.5 R, 343-345

[56] References Cited

U.S. PATENT DOCUMENTS

| 556,485 | 3/1896 | Wilson | 24/129 R |
| 828,765 | 8/1906 | Nilsson | 24/130 |
| 1,420,487 | 6/1922 | Kent | 24/230.5 R X |
| 2,357,478 | 9/1944 | Koch | 24/129 R X |
| 2,439,141 | 4/1948 | Meighan | 24/129 R |
| 2,481,610 | 9/1949 | Meighan | 24/129 R |
| 2,595,806 | 5/1952 | Morris | 24/129 R |
| 4,432,121 | 2/1984 | Dupre | 24/130 X |

FOREIGN PATENT DOCUMENTS

| 633102 | 7/1936 | Fed. Rep. of Germany | 24/130 |
| 2455693 | 1/1981 | France | 24/130 |

Primary Examiner—Johnny D. Cherry
Attorney, Agent, or Firm—Eric P. Schellin

[57] ABSTRACT

Improved Elastic cable safety hook comprising a vertical opening in the lower part, bridgelets on either side of longitudinal plane of the hook, and contoured longitudinal imprints to facilitate engagement and withdrawal of cables.

3 Claims, 3 Drawing Figures

SECURITY CLAMP FOR CABLES

The invention has for its object a safety hook, more particularly for elastic fastening and securing cables.

The object of the invention pertains to the art unit of the elastic fastening means.

A safety hook described in the French Pat. No. 80.14580 has already been proposed by the Applicant. This hook comprises a hook-shaped head extended at the lower portion thereof, on the one hand normal to the longitudinal plane thereof, and on the other hand, on either side the lower extreme joining portion thereof, in the form of a transverse tunnel for the passage of the two strands of a loop-forming elastic cable, and of a nose-forming projecting portion, defining with the opposite wall of said hook a cavity or a neck, the assembly constituting the anchoring means, the hook being such that after the aforesaid loop has been engaged within the tunnel, the loop is so stretched that it will pass round the external periphery of the head of the hook to be engaged and clasped by self-tightening with the said cavity or neck.

In accordance with the invention, and on account of this basic design, the purpose of the invention has been the improvement of the advantageous results which had been achieved, more particularly concerning the manufacture proper of the hook, the positioning and anchoring of the elastic cable.

For this purpose, the hook portion contoured and arranged for permitting the engagement and the anchoring of the cable is provided within the thickness thereof with a contoured opening with vertically offset bridgelets on either side, said bridgelets spanning the opening and being open and/or closed for the introduction or the withdrawal of the cable and the positioning thereof in combination with said opening.

These and further characteristics will be apparent from the following description.

To make the object of the invention better understood, without however restricting it thereby, in the attached drawings.

Figures 1, 2:
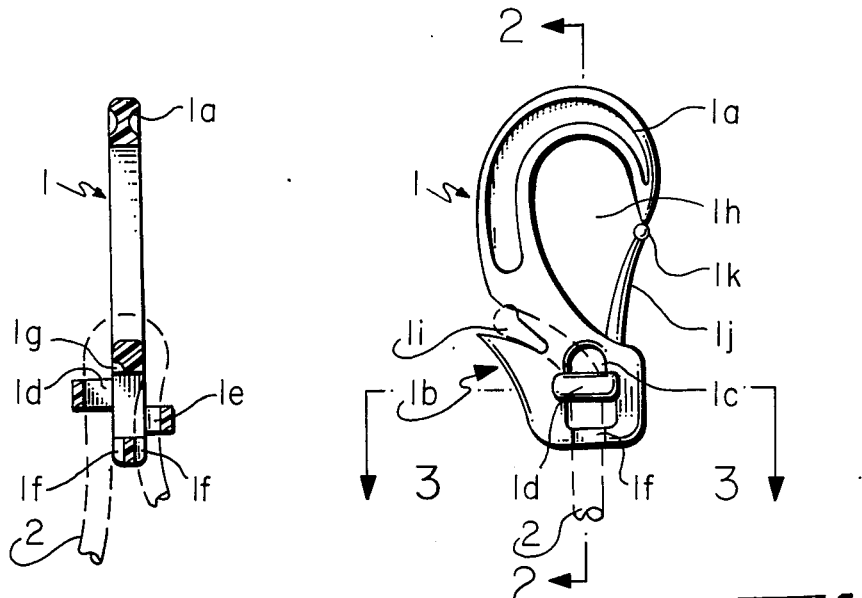
FIG. 1 is a front view of the hook.
FIG. 2 is a cross-sectional view along the line 2—2 of FIG. 1.

There may be seen in FIG. 1 that the hook, denoted generally by (1), comprises a hook-shaped head (1a) and opposite a portion (1b) formed and arranged for the engagement and the anchoring of an elastic cable (2). In accordance with the invention, the portion (1b) is provided within the thickness thereof with a contoured vertical slot (1c). Guiding and positioning means (1d and 1e) are formed on either side of the slot (1c).

Figure 3:
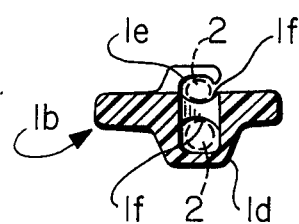
FIG. 3 is a plane and cross-sectional view along the line 3—3 of FIG. 1.

Said means (1d–1e), in the form of open and/or closed bridgelets, are vertically offset in regard to one another, and overlap entirely or in part the slot (1c) (FIGS. 2 and 3). These bridgelets permit the introduction and the withdrawal of the cable (2) and the positioning thereof, in combination with the opening (1c). The lower and/or upper edge or edges of the opening (1c) are provided with contoured imprints (1f–1g) in order to facilitate the engagement and the withdrawal of the cable (2).

In the example illustrated, the bridgelet (1d) is closed, entirely, while the opposite and offset bridgelet (1e) is open, in part (FIG. 3).

Opposite the opening (1b) of the head of the hook (1a), the body of the hook has an anchoring cavity (1i) which while being angularly and vertically offset in regard to the two bridgelets (1d–1e) is provided with a plurality of decreasing sections for holding the cable (2) by squeezing it.

On the other hand, the head (1a) of the hook (1) is provided at the bottom of the opening thereof (1h) with a tongue (1j) forming an interlocking pawl which can be spaced apart by elasticity in order to clear temporarily the opening (1h) of said hook (FIG. 2). This tongue is formed directly for instance at the time of molding the hook and has at the free end thereof a projection (1k) which is abutted on the end of the bent portion of the hook head (1a).

In accordance with the positioning of the cable on the hook, such as defined, there is obtained a splitting up of the tensile stress. The cable (2) is engaged across the closed bridgelet (1d) then within the second open bridgelet (1e) while being held within the anchoring opening (1i).

The advantages in accordance with the invention result from the easiness of the de-molding of the hook, more particularly on account of the vertical offset of the two bridgelets (1d and 1e). The latter are obtained by means of two reversed cores permitting a direct demolding without the necessity to use the orifices of retractable or collapsible sliders.

Moreover, the hook offers a better grip for the installation thereof.

I claim:

1. Safety hook for securing elastic cables, including a hook-shaped head (1a) and opposite thereto a portion (1b) formed and arranged for the engagement and the anchoring of an elastic cable (2), characterized in that said portion (1b) is provided within the thickness thereof with a contoured opening (1c) having vertically offset bridgelets (1d, 1e) on each side, and contoured longitudinal imprints (1f, 1g) to facilitate positioning and engagement of said cable, said bridgelets overlapping the opening and being open and closed for the introduction, withdrawal, and positioning of the cable in combination with said opening (1c).

2. Hook as claimed in claim 1, characterized in that said hook includes opposite said hook-shaped head (1a) an anchoring cavity (1i) which is vertically and angularly off-set in regard to said bridgelets (1d and 1e), and is formed sectionally to hold the cable (2) by squeezing.

3. Hook as claimed in claim 1, characterized in that said head (1a) is provided directly at the bottom thereof with a tongue (1j) forming an interlocking pawl which can be spaced apart by elasticity in order to clear temporarily said opening (1h) of the head (1a) of the hook.

* * * * *